UNITED STATES PATENT OFFICE.

M. FISHER AND W. MARTIN, JR., OF NEWPORT, MAINE.

WELDING CAST-IRON TO MALLEABLE IRON OR STEEL.

Specification forming part of Letters Patent No. 5,331, dated October 16, 1847; Reissue No. 227, dated November 30, 1852.

*To all whom it may concern:*

Be it known that MARK FISHER and WILLIAM MARTIN, Jr., of Newport, in the county of Penobscot and State of Maine, have made a new and useful improvement in the manner of uniting or welding cast-steel and steel of other kinds with cast-iron; and we do hereby declare that the following is a full and exact description thereof.

Various attempts have been made to unite or weld cast-steel and steel of other kinds or wrought-iron with cast-iron by the casting of the iron in a molten state upon the steel or wrought-iron. The process by which this has been attempted has been to prepare a plate or other duly-formed piece of cast-steel, or of other kind of steel, or of wrought-iron, by brightening the part with which it was intended the cast-iron should unite and coating it with calcined borax or other analogous flux. The piece thus prepared has then been laid in its proper place in the mold in which the casting was to be made, and the molten iron has then been poured in upon it. The results of this mode of procedure have been altogether uncertain and unsatisfactory. In some cases the union has appeared to be perfect; but in a very large majority of cases the union has been extremely partial and has most frequently failed entirely. The consequence has been that after much loss the procedure has been abandoned, which, if successful, would have been of great value.

In our improved process we prepare the plate or piece of cast or other steel or of wrought-iron in the manner above described, brightening its surface, coating it with calcined borax, and laying it in the flask or mold. Thus far there is not any novelty in our manner of proceeding.

Our invention consists in causing the melted iron to flow over and upon the cast or wrought steel in a current, properly forming and arranging inlet and outlet gates, by which the metal is made to flow over the prepared surface of the steel laterally, and is made thereby, as it were, to wash it. By this means fresh particles of the molten iron are brought into successive contact with every portion of the face of the steel or wrought-iron, and while the flux protects the metal from oxidation all foreign matter is completely removed and the union of the two metals is perfect.

In the molding of some articles it will be necessary to form a recess in the sand to receive the waste metal that has been allowed to flow over the cast-steel; but where there are a number of similar articles in the flask every competent founder will be able so to arrange the jets as that the molten metal will pass from one prepared piece of steel or iron to the other, in the first instance, and as the flasks fill the articles will be perfected, without the necessity of any receptacle for waste metal, all of which will be readily understood by the molder.

Having thus fully described the nature of our improvement in the process of uniting or welding cast-steel or steel of other kinds, we do hereby declare that we do not claim the uniting of the two portions of metal with each other by merely pouring the cast-iron upon the prepared piece of steel or of wrought-iron, this having been frequently attempted; but

We limit our claim to improvement to—

The lateral flow of the molten iron over the steel by means of the jets through which the molten iron passes into and out of the flask, so arranged as to cause the metal to flow in a current laterally over the surface of the prepared steel, for the purpose and substantially in the manner herein fully made known.

M. FISHER.
JOHN H. NORRIS.

Witnesses:
CHARLES WYMAN,
JOHN STURGIS.